United States Patent
Da Silva et al.

(10) Patent No.: US 9,663,217 B1
(45) Date of Patent: May 30, 2017

(54) ASSEMBLIES AND METHODS FOR RECONFIGURING AIRCRAFT FUSELAGE DOORS

(71) Applicant: EMBRAER S.A., São Jose dos Campos (BR)

(72) Inventors: Jorge Luiz Ribeiro Da Silva, São Jose dos Campos (BR); Henrique Cezar Souza, São Jose dos Campos (BR); Carlos Alberto Vilela De Magalhães, São Jose dos Campos (BR)

(73) Assignee: EMBRAER S.A., São José Dos Campos-SP (BR)

( * ) Notice: Subject to any disclaimer, the term of this patent is extended or adjusted under 35 U.S.C. 154(b) by 0 days.

(21) Appl. No.: 14/937,011

(22) Filed: Nov. 10, 2015

(51) Int. Cl.
*B64C 1/14* (2006.01)
*B64F 5/00* (2017.01)

(52) U.S. Cl.
CPC .......... *B64C 1/1461* (2013.01); *B64C 1/1423* (2013.01); *B64F 5/0036* (2013.01)

(58) Field of Classification Search
CPC ....... B64C 1/14; B64C 1/1407; B64C 1/1423; B64C 1/143; B64C 1/1461; B64F 5/0009; B64F 5/0036; F16M 11/10; F16M 11/20
See application file for complete search history.

(56) References Cited

U.S. PATENT DOCUMENTS

| 4,154,416 A * | 5/1979 | Bruce | B64D 11/00 114/66 |
|---|---|---|---|
| 5,135,205 A * | 8/1992 | Bedard | B25H 1/0007 254/100 |
| 5,520,358 A * | 5/1996 | Kahn | B64C 1/14 244/1 R |
| 6,616,097 B2 * | 9/2003 | Hilbert | B64C 1/20 244/118.1 |
| 6,698,690 B2 * | 3/2004 | Novak | B64C 1/1423 244/118.5 |
| 8,657,230 B2 * | 2/2014 | Woodland | B64C 1/1461 244/118.1 |
| 8,807,482 B2 * | 8/2014 | Woodland | B64C 1/1407 244/118.1 |
| 2005/0029399 A1 * | 2/2005 | Lowe | G03B 15/006 244/118.1 |
| 2010/0206992 A1 * | 8/2010 | Woodland | B64C 1/1461 244/137.1 |
| 2014/0077034 A1 | 3/2014 | Woodland et al. | |

* cited by examiner

Primary Examiner — Joseph W Sanderson
(74) Attorney, Agent, or Firm — Nixon & Vanderhye P.C.

(57) ABSTRACT

Assemblies and methods are provided to allow a temporary alternate door (e.g., an observation door for use during search and rescue (SAR) missions) may be placed in a fuselage opening normally closed by a dedicated personnel door. The assembly may be provided with a central support pole attachable to interior structure of the aircraft fuselage so as to be disposed in an upright position within an interior of the aircraft fuselage (e.g., within the aircraft's cargo hold), and at least one stand-by alternate door (e.g., an observation door) which is sized and configured to be operatively accepted by the aircraft fuselage door opening when the dedicated primary aircraft door is in an opened and stowed condition. Typically a pair of stand-by alternate doors are removably connected to the central support pole so as to be capable of being movably deployed into a position to close the aircraft fuselage opening when disconnected from the central support pole.

29 Claims, 8 Drawing Sheets

ASSEMBLIES AND METHODS FOR RECONFIGURING AIRCRAFT FUSELAGE DOORS

FIELD

The embodiments described herein relate generally to assemblies and methods by which aircraft doors may be reconfigured for different operations and/or missions, e.g., changing an aircraft personnel door for the ingress/egress of personnel (e.g., paratroopers) into/from the aircraft having relatively limited visibility, to an observation door having greater visibility to more readily permit external observation by aircraft crewmembers.

BACKGROUND

Utility transport (cargo) aircraft operated by civilian transportation companies, governmental agencies and air forces are sometimes required to perform a number of missions, including the transport of personnel and material in addition to providing an airborne search and/or observation platform, e.g., during territorial patrol operations, search and rescue (SAR) operations, emergency patrol missions and the like. The aircraft fuselage doors employed for transport and ingress/egress of personnel are typically dedicated doors that allow the aircraft to be pressurized, yet can be opened during flight at lower altitudes when the aircraft is depressurized to allow personnel (e.g., paratroopers) and/or supplies to be discharged from the aircraft. Dedicated aircraft fuselage doors however are typically unsatisfactory for airborne search and/or observation missions by virtue of their limited range of exterior visibility provided to on-board aircraft personnel.

Due to the increased field of vision that is provided to on-board aircraft personnel, observation doors (conventionally known as "bubble doors") are typically employed for aircraft used for SAR and other observation missions. Although various types of aircraft are equipped with dedicated observation doors, it can sometimes be more desirable to provide an aircraft operator with the flexibility to replace a dedicated aircraft personnel door with a temporarily installed observation door when needed. One prior proposal for the temporary replacement of a dedicated aircraft fuselage personnel door with an observation door is disclosed by U.S. 2014/0077034 (the entire content of which is expressly incorporated hereinto by reference). One drawback of such a conventional temporarily installed observation door, however, is that it cannot readily be installed while the aircraft is in-flight and is relatively complex.

What has been needed in the art, therefore, are assemblies and methods by which a dedicated aircraft personnel door may be replaced temporarily and more readily with an observation door. It would also be especially desirable in terms of maximum mission flexibility if such aircraft door replacement could be achieved while the aircraft is in-flight. It is towards providing solutions to such needs that the embodiments disclosed herein are directed.

SUMMARY

The embodiments disclosed herein are directed towards assemblies and methods whereby a temporary observation door may be placed in a fuselage opening normally closed by a dedicated personnel door so the opening may be reconfigured to adapt the aircraft to an observation mission. According to some embodiments, the assembly is provided with a central support pole attachable to interior structure of the aircraft fuselage so as to be disposed in an upright position within an interior of the aircraft fuselage, and at least one stand-by alternate door (e.g., an observation door) which is sized and configured to be operatively accepted by the aircraft fuselage door opening when the dedicated primary aircraft door is in an opened condition. Typically a pair of stand-by alternate doors are removably connected to the central support pole so as to be capable of being movably deployed into a position to close the aircraft fuselage opening when disconnected from the central support pole.

The assembly may be provided with upper and lower mounting assemblies. In order to removably mount the stand-by alternate door(s) to the central support pole. According to some embodiments, the lower mounting assembly may comprise at least one lower mounting clip associated with the central support pole and at least one lower mounting arm associated with a lower portion of the door frame of the observation door which is removably connected to the at least one lower mounting clip of the central support pole. The upper mounting assembly may comprise at least one upper mounting arm associated with an upper portion of the door frame, and a mounting carriage slideably coupled to the central support pole for rectilinear movements between raised and lowered positions thereof. The mounting carriage may therefore include at least one upper mounting clip removably connected to the at least one upper mounting arm.

Certain embodiments will provide the stand-by alternate door(s) with a pair of wheels journaly mounted to a lower portion of the door frame for rolling movements along a surface (e.g., along the cargo deck of the aircraft). In such embodiments, the lower portion of the door frame may include a pair of spaced-apart support brackets, whereby each of the wheels is journaly mounted to a respective one of the support brackets.

The central support pole may be adjustable lengthwise to accommodate different vertical heights within an aircraft interior cargo hold. In order to accommodate such lengthwise adjustment, certain embodiments will include a central support pole having a tubular main pole and an extension pole received telescopically within the tubular main pole so as to be extendible relative to the main pole and thereby allow lengthwise extension of the central support pole.

In use, a fuselage door opening normally closed by a dedicated personnel door may be reconfigured when the personnel door is in an opened condition by removing a stand-by alternate door from the assembly mounted in the interior cargo hold of the aircraft and moveably manipulating the stand-by alternate door into position within the opening. The assembly including a central support pole and one (or preferably pair of) stand-by alternate doors may be brought on-board the aircraft, e.g., as part of an observation (SAR) pallet. The assembly may then be erected adjacent to the dedicated personnel doors of the aircraft while the aircraft is on the ground or while airborne by positioning the central support pole in an upright position within the interior aircraft cargo hold and attaching its opposed ends to aircraft fuselage structure (e.g., cargo tie-down rails or the like).

When it is desired to reconfigure the aircraft door, the dedicated personnel door may be moved and stowed in an opened condition to thereby expose the door opening. If airborne, the aircraft must be at a sufficient low altitude to allow for depressurization before opening of the dedicated personnel door and the on-board crewmembers must be secured by suitable safety harnesses. Thereafter, a stand-by alternate door may be removed from the support pole and transported to the fuselage door opening. Once the door is moved so as to be adjacent to the door opening, it may be positioned and latched removable to the fuselage while maintaining the dedicated personnel door in an opened condition.

The stand-by alternate door may be removed from the central support pole by disengaging a lower mounting assembly from a lower portion of the at alternate door so as to allow the lower portion thereof to be moved outwardly away from the central support pole while an upper portion thereof remains connected to the central support pole by an upper mounting assembly. The upper mounting assembly will be allowed to slideably move lower along the support pole while the lower portion of the alternate door is moved outwardly away from the central support pole.

According to some embodiments, movement of the stand-by alternate door is facilitated by establishing rolling engagement between the wheels and the cargo deck and rolling the lower end of the at least one observation door across the cargo deck by the rolling engagement between the wheels and the cargo deck. Thereafter, the upper mounting assembly may be disengaged from the alternate door so that the upper portion of the alternate door is disconnected from the central support pole. At such, time the entire alternate door may be moved toward the fuselage door opening by on-board crewmembers (i.e., since the alternate door is disconnected from the central support pole) and secured in place.

The alternate door may be secured in the fuselage door opening by engaging connection claws and respective stationary mounting pins while an upper portion of the at least one observation door is tilted inwardly within the interior cargo hold. Once the claws and mounting pins are engaged, the upper portion of the at least one observation door may be pivoted about the stationary mounting pin until the at alternate door closes the fuselage door opening, at which time is may be securely latched in place.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which.

DETAILED DESCRIPTION

Figure 1:
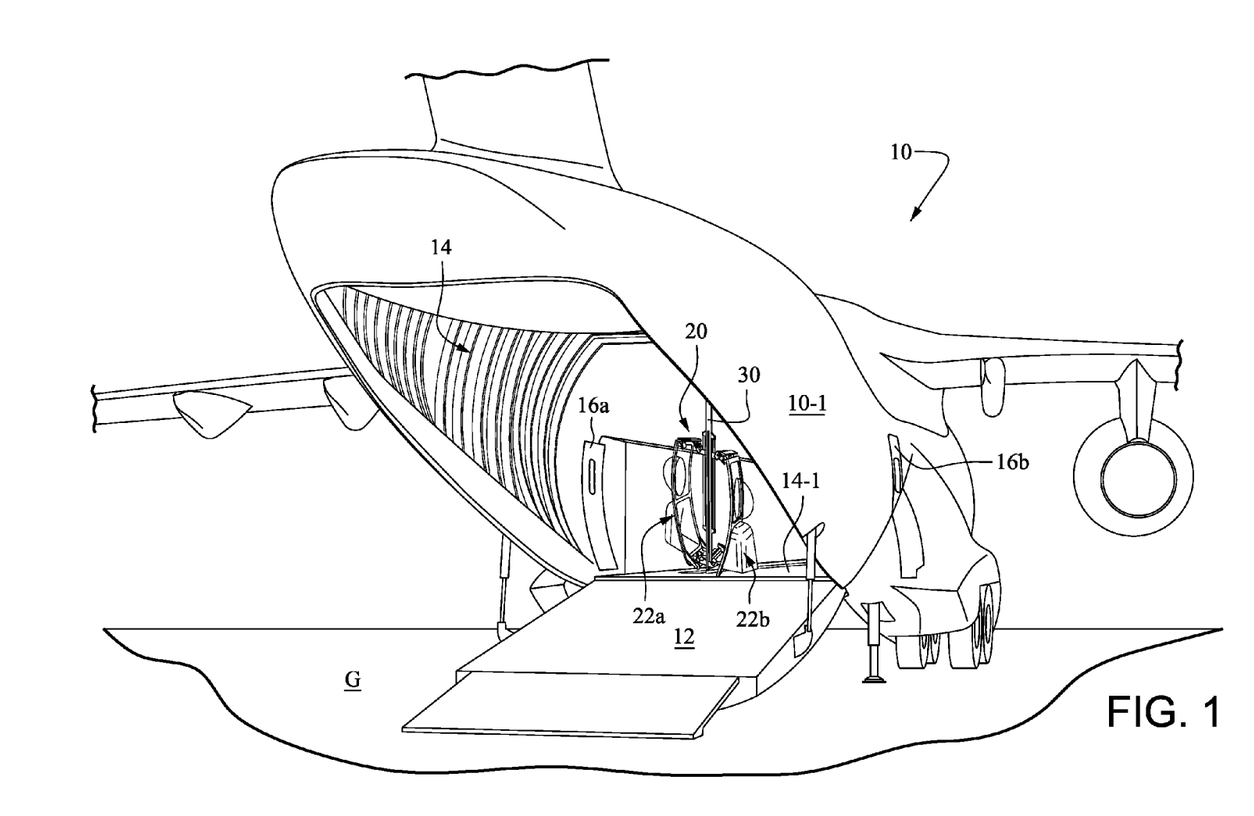
FIG. 1 is a rear perspective view of a utility transport aircraft showing an exemplary temporary observation door assembly according to an embodiment of the invention at a stand-by position within the cargo space thereof.

Accompanying FIG. 1 is an aft view of a utility transport (cargo) aircraft 10 which is shown with the bulk cargo door ramp 12 in a lowered position while the aircraft is on the ground G thereby exposing the interior aircraft cargo hold 14. The aircraft 10 is shown as including exemplary port and starboard personnel doors 16a, 16b on the port and starboard sides, respectively, of the aircraft fuselage 10-1. As can be seen in FIG. 1, the interior aircraft cargo hold 14 may be provided with a temporary observation door assembly 20 having port and starboard temporary observation doors 22a, 22b that may replace the dedicated personnel doors 16a, 16b and thereby allow reconfiguration of the aircraft 10 to perform an observation, e.g., SAR, mission.

It is noted that accompanying FIG. 1 depicts the temporary observation door assembly 20 in a standby and ready position even though the aircraft 10 is shown to be on the ground. Typically, however, the various components of the assembly 20 to be described in greater detail below will be disassembled from one another and loaded aboard the aircraft on a mission pallet (not shown) while the aircraft 10 is on the ground. The aircraft 10 will thus typically be airborne when the flight crewmembers remove the component parts of the assembly 20 from the supplied pallet and erect them in the interior of the aircraft 10 as shown in FIG. 1. The assembly 20 of course could likewise be pre-assembled on the ground as depicted if deemed desirable or necessary by the mission operator.

Figure 2:
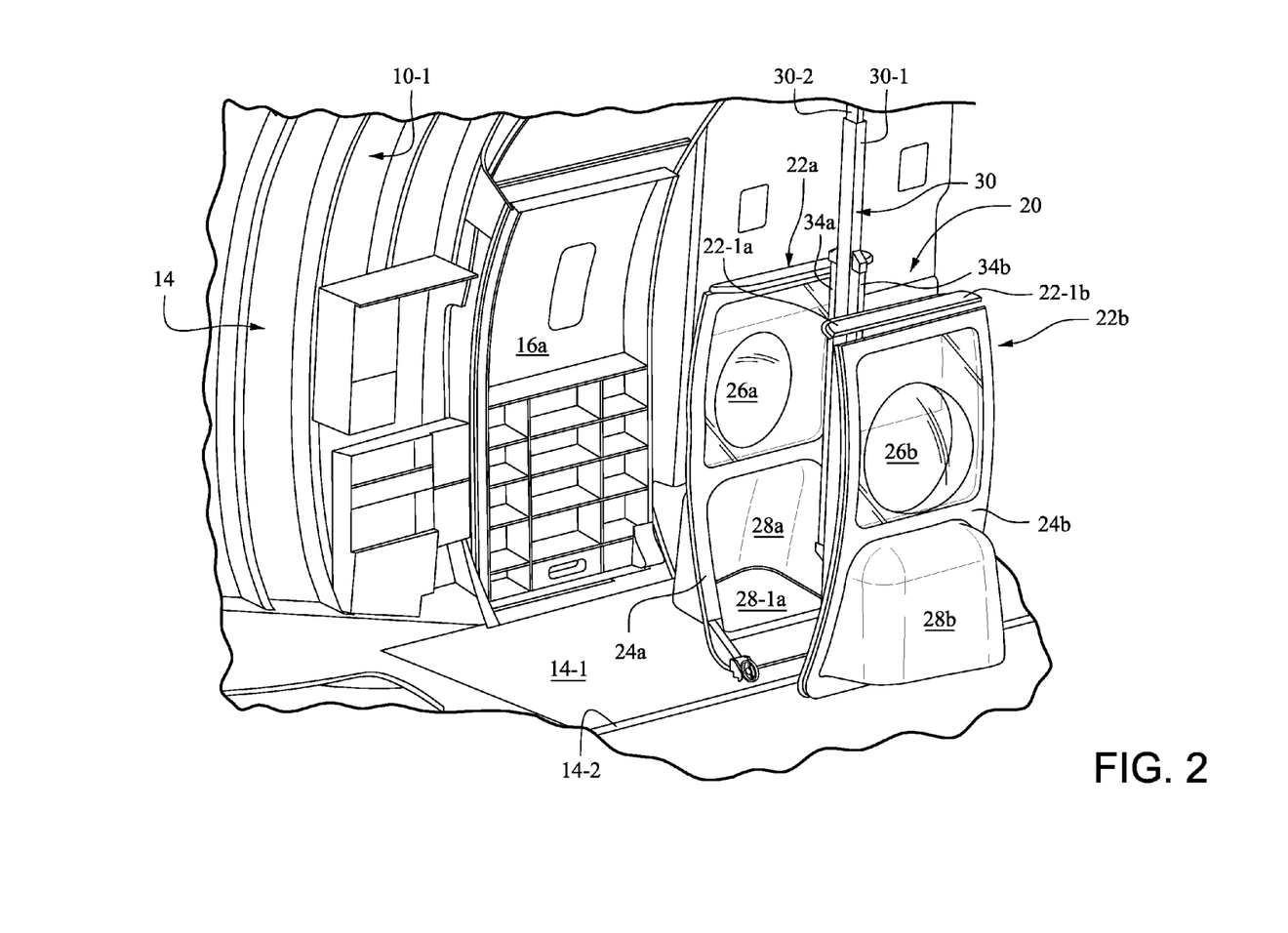
FIG. 2 is an enlarged interior perspective view of the temporary observation door assembly at the stand-by position within the cargo hold of the aircraft as shown in FIG. 1 depicted with the dedicated personnel door in a closed condition.
Figure 3:
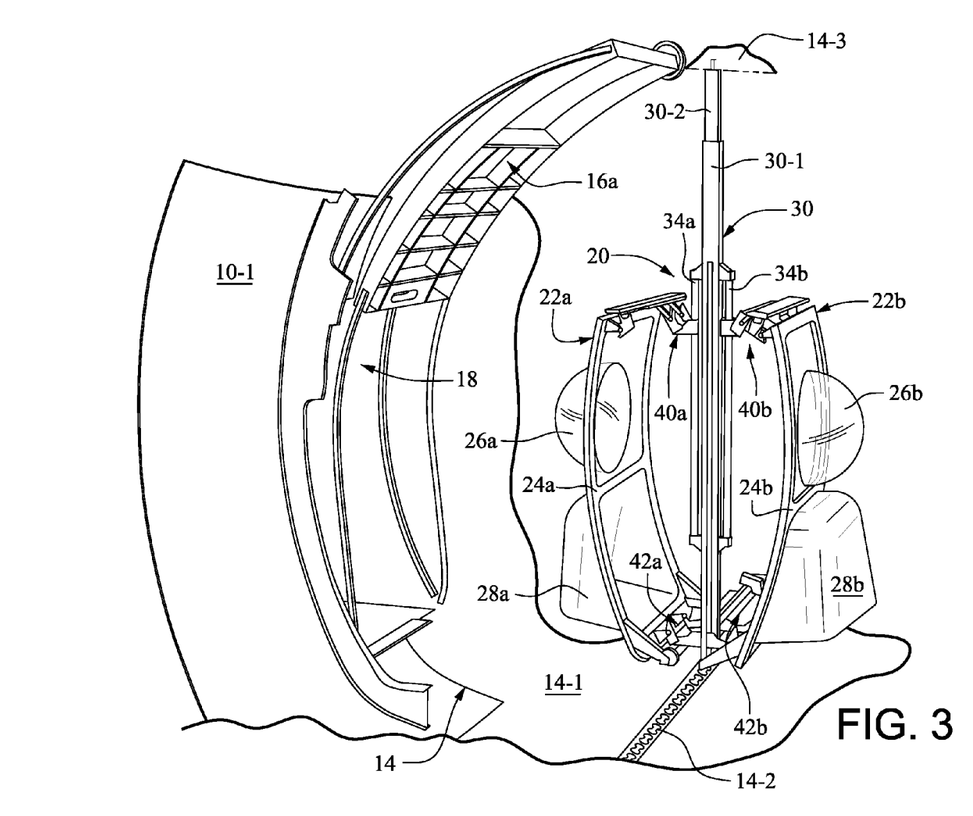
FIG. 3 is another interior perspective view of the temporary observation door assembly at the stand-by position within the cargo hold of the aircraft similar to FIG. 2 but shown with the dedicated personnel door in an opened condition.

Accompanying FIGS. 2 and 3 depict in an enlarged manner the temporary observation door assembly 20 in a stand-by location within the interior cargo hold 14. As shown, the assembly 20 includes the temporary port and starboard observation doors 22a, 22b which may temporarily be positioned within the fuselage openings when the dedicated personnel doors 16a, 16b are opened. The port fuselage opening 18 is shown in FIG. 3 with the corresponding dedicated personnel door 16a in a stowed opened and locked condition (e.g., by operating conventional onboard door opening hydraulics and/or electrical actuators (not shown) associated with the door 16a).

Each of the temporary observation doors 22a, 22b is removably attached to a central support pole 30 in a manner described hereinbelow. The support pole 30 is elongate and has a lower end removably attached to a conventional cargo hold rail 14-2 positioned lengthwise relative to the aircraft fuselage 10-2 in the cargo deck 14-1. In a similar manner, the upper end of the support pole 30 may be removably attached to overhead fuselage structure or an overhead cargo hold rail 14-3 (see FIG. 3) so that the support pole 30 is positioned substantially vertically upright within the cargo hold 14 adjacent to the doors 16a, 16b. In order to accommodate varying heights within the cargo hold 14, the support pole 30 may be formed of a tubular main pole member 30-1 and an extension pole member 30-2 telescopically received within the main pole member 30-1. The extension pole member 30-2 may therefore be extended upwardly from the main pole member 30-1 and positionally locked to the main pole member 30-1 once the desired lengthwise extent is achieved by a suitable locking clamp 32 (see FIG. 3). The central support pole 32 also includes a pair of parallel guide poles 34a, 34b to assist in the mounting and dismounting of the doors 22a, 22b, in a manner to be described in greater detail below.

The doors 22a, 22b may be provided with respective door frames 24a, 24b such that a relatively large transparent upper observation pane provided with generally hemispherical observation bubble windows 26a, 26b therein. The lower portion of the door frames 24a, 24b may be provided with an outwardly protruding enclosure 28a, 28b having a lower platform 28-1a, 28-1b to allow on-board personnel to stand near the door so that the observer's head may be positioned in the observation bubble windows 26a, 26b. The lower platforms 28-1a, 28-1b of the enclosures 28a, 28b, respectively, may have a portion that is openable to allow on-board personnel to air-drop items from the aircraft 10 (e.g., data marker beacons, visible flares, communication and/or navigation buoys and the like).

Figure 4A:
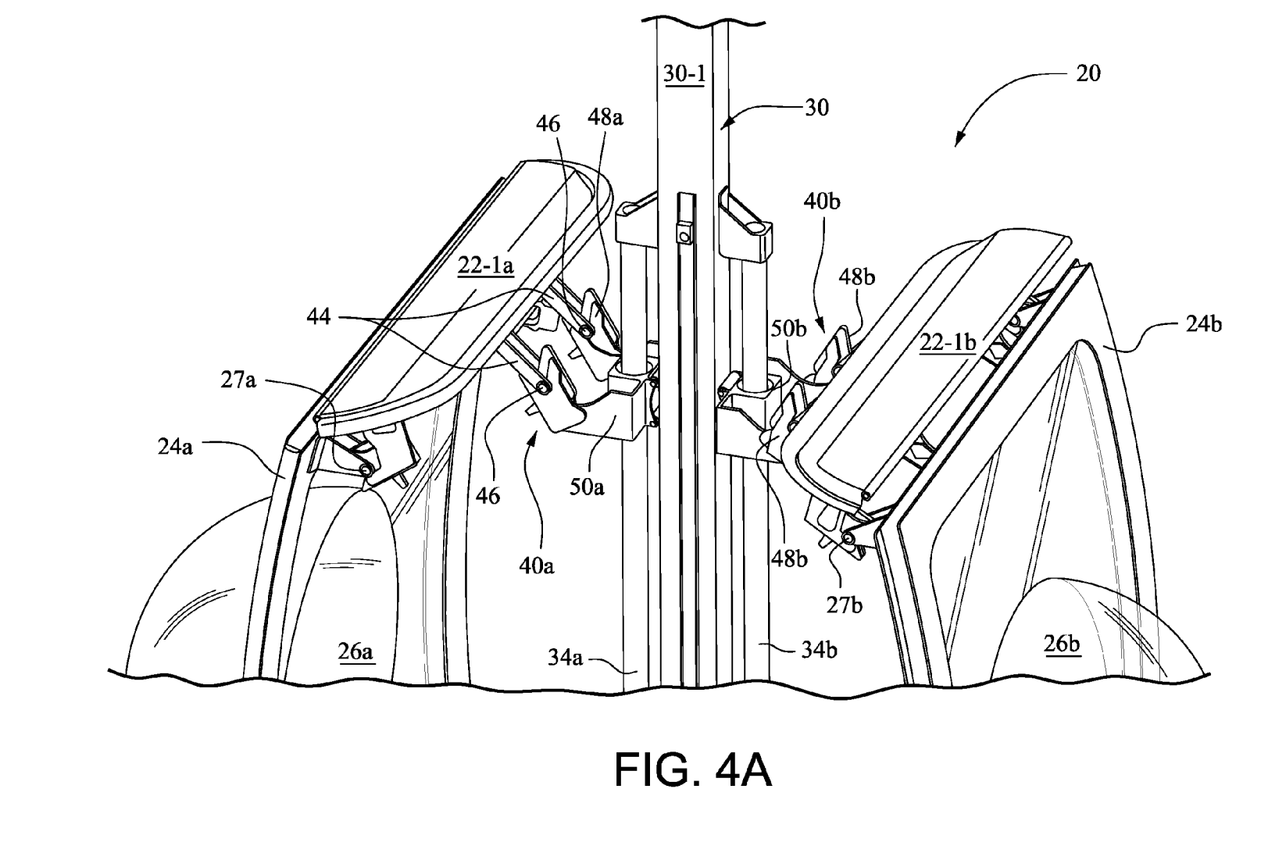
FIGS. 4A and 4B are enlarged perspective views of the upper and lower end regions of the observation doors associated with the temporary observation door assembly in the stand by position particularly depicting the upper and lower mounting assemblies, respectively, to mount the temporary observation doors to the central support pole of the assembly.
Figure 4B:
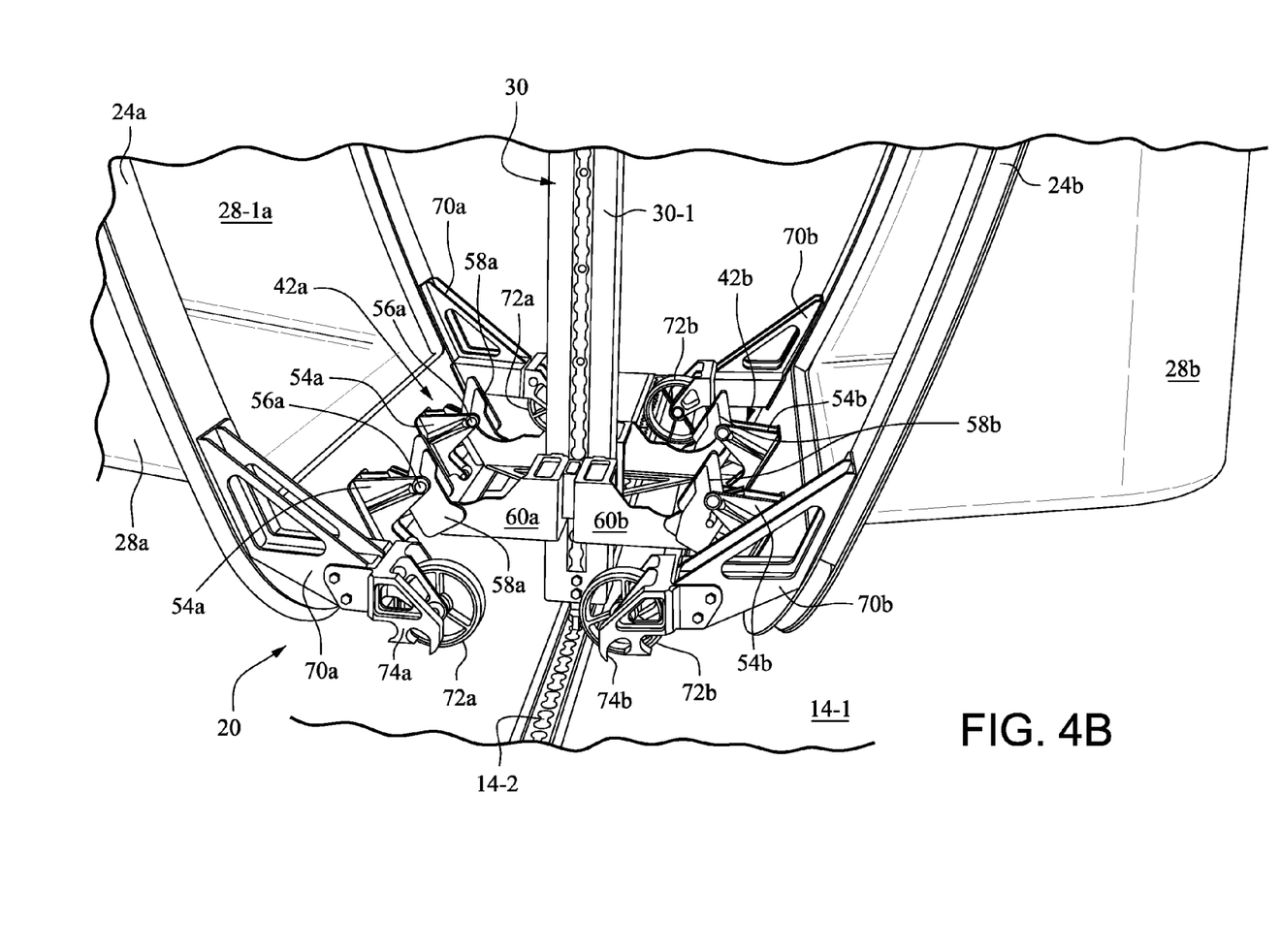

The upper and lower mounting assemblies 40a, 40b and 42a, 42b, respectively, to removably mount the observation doors 22a, 22b to the central support pole 30 of the assembly 20 are shown in greater detail in accompanying FIGS. 4A and 4B. Specifically, as shown in FIG. 4A, an upper panel 22-1a, 22-1b of the doors 22a, 22b is preferably articulated relative to the door frames 24a, 24b by hinges 27a, 27b. The upper panels 22-1a, 22-1b include outwardly projecting mounting arms 44 having transverse mounting pins 46 removably received within a respective one of the quick-release mounting clips 48a, 48b. Only the mounting arms 44 and pins 46 received within the mounting clip 48a which are associated with the upper panel 22-1a are visible in FIG. 4A, but it will be understood that such structures are similarly provided in the upper panel 22-1b so as to be removably received by the mounting clip 48b. The mounting clips 48a, 48b are operatively connected with a carriage member 50a, 50b slideably coupled to the guide poles 34a, 34b, respectively, associated with the central support pole 30 so as to be rectilinearly movable between raised and lowered positions along the guide poles 34a, 34b with respect to the cargo deck 14-1.

The lower mounting assemblies 42a, 42b, like the upper mounting assemblies 40a, 40b, will include outwardly projecting mounting arms 54a, 54b having transverse mounting pins 56a, 56b associated with the lower portion of the door frames 24a, 24b. The mounting pins 56a, 56b are removably received within a respective one of the quick-release mounting clips 58a, 58b connected operatively to the mounting brackets 60a, 60b positionally fixed to a lower end of the central mounting pole 30.

Figure 7:
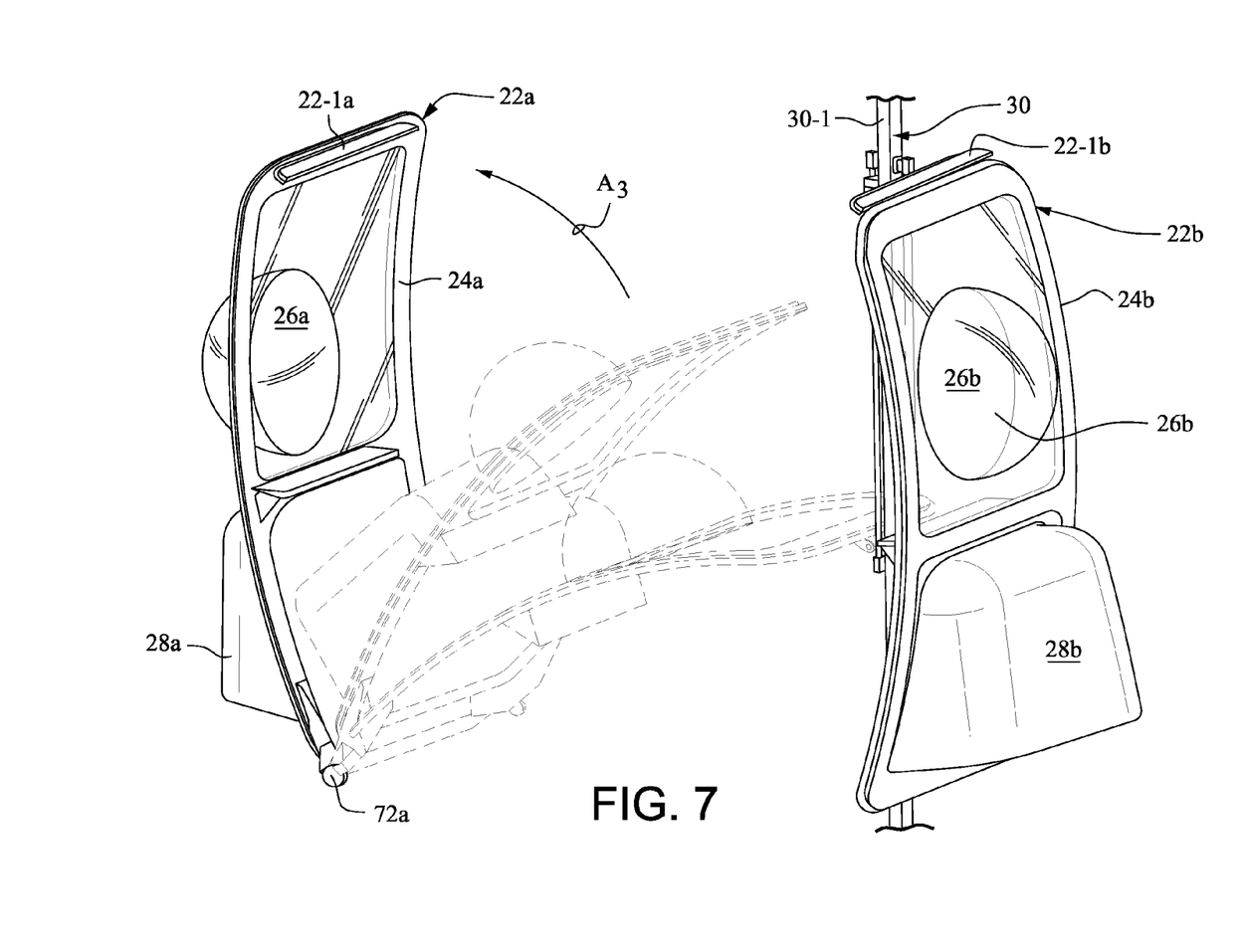
FIG. 7 is a schematic perspective view showing a sequence for the installation of the temporary observation door at the fuselage door opening during a reconfiguration operation.

As is also visible in FIG. 4B, the lower portion of the door frames 24a, 24b include a pair of laterally separated support brackets 70a, 70b each of which includes a respective wheel 72a, 72b journally connected thereto so as to allow rolling movements of the door 22a across the cargo deck 14-1. The support brackets 70a, 70b also include a connection claw 74a, 74b that is adapted to cooperate with a stationary pin (identified in FIG. 7 by reference numeral 80) to mount the door frames 24a, 24b in a respective fuselage opening 18 when the personnel doors 16a, 16b are in an opened condition.

The following description will focus on the port side personnel door 16a and its associated temporary observation door 22a, it being understood that such description is equally applicable to the starboard side personnel door 16b and its associated temporary observation door 22b.

In use, the opening 18 associated with the personnel door 16a is initially provided by moving the door 16a into its opened condition. Such a state is shown in FIG. 3. The opening of the door 16a and the positioning of the temporary observation door 22a in the opening 18 may, if desired, be accomplished while the aircraft 10 is in-flight provided that the onboard personnel are equipped with suitable safety straps while the door 16a is opened and the aircraft 10 is at a sufficiently low altitude so as to be depressurized.

Figure 5:
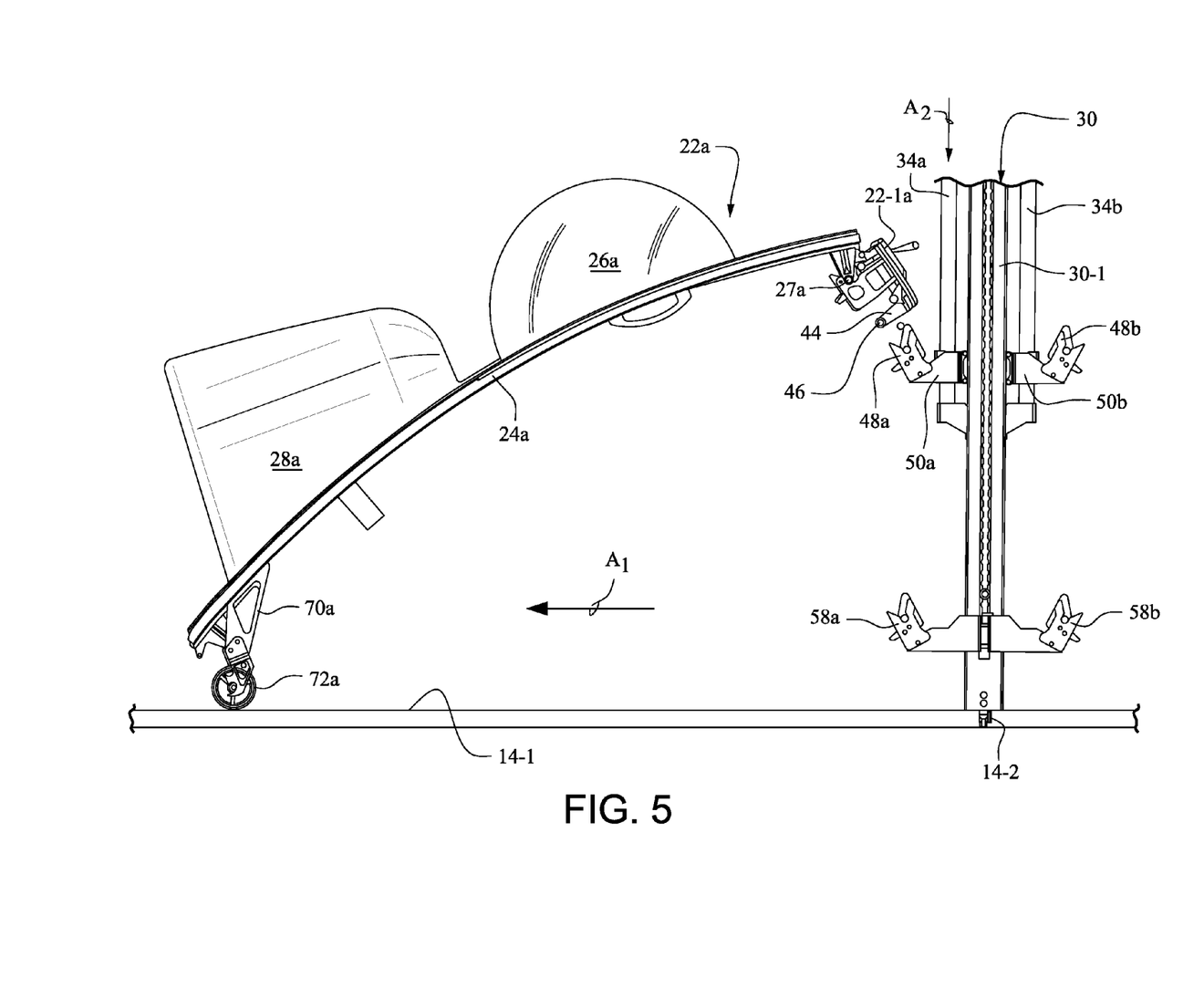
FIG. 5 is an elevational view showing a state in which an exemplary temporary observation door is disconnected from the central support pole of the assembly during a reconfiguration operation.

The temporary observation door 22a is prepared for movement into an occupying position within the opening 18 when the door 16a is opened by initially releasing the pins 56a associated with the lower mounting assembly 42a from their respective engagement with the mounting clips 58a while substantially concurrently moving the lower part of the door frame 24a outwardly away from the central mounting pole 30 (i.e., in the direction as shown by arrow A1 in FIG. 5). Such movement of the door frame 22a is preferably accomplished manually by onboard crewmembers being positioned on respective opposite sides of the door 22a. Movement of the door frame 24a outwardly away from the central mounting pole 30 is facilitated by rolling engagement of the wheels 72a across the cargo deck 14-1 within the cargo hold 14 of the aircraft 10. Continued movement of the door frame 24a outwardly away from the central mounting pole 30 by the crewmembers will also responsively cause the carriage member 50a to slideably move downwardly toward the cargo deck 14-1 along the guide post 32a (i.e., in the direction of arrow A2 in FIG. 5).

Once the carriage member 50a has been lowered sufficiently, the attending crewmembers will disengage the pins 46 from the mounting clips 48a associated with the upper mounting assembly 40a. At this time the crewmembers will be physically supporting the door 22a, for example by positioning a crewmember on each side of the door 22a and holding the door 22a by the provided interior handles 80, while they continue to advance the door 22a outwardly away from the central mounting pole 30 and toward the opening 18. As noted previously, such advancement of the door 22a is facilitated by the rolling movement of the wheels 72a across the cargo deck 14-1 of the aircraft 10.

Figure 6:
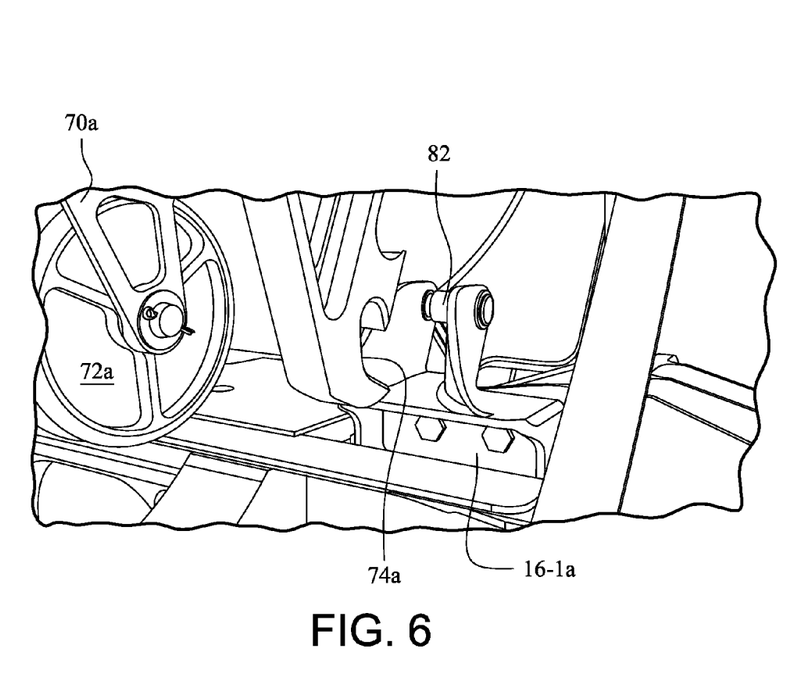
FIG. 6 is a greatly enlarged elevational view of the bottom latch system associated with an exemplary temporary observation door.

As shown in FIG. 6, once the lower part of the door frame 24a of the door 22a has been positioned immediately adjacent to the opening 18, the connection claw 74a will be aligned with the stationary door mounting pin 82 fixed to the lower part of the door supporting structure 16-1a of the door 16a surrounding the opening 18. Upon engagement between the connection claw 74a and the door mounting pin 82, the crewmembers may then raise the door 22a by pivoting the door frame 24a about the pin 82 (i.e., in the direction shown by arrow A3 in FIG. 7) until the door frame 24a is positioned in the opening 18 in engagement with the door supporting structure 16-1a of the fuselage 10-1. Thereafter, the upper panel 22-1a may be pivoted so as to be an extension of the door frame 24a and close the opening 18. The thus positioned temporary observation door 22a may then be removably fixed to the door supporting structure by engagement with conventional door latches (not shown) associated with the door supporting structure 16-1a.

The removal of the temporary door 22a and placement back into a stand-by ready position whereby the door 22a is connected to the central supporting pole 30 may proceed in a manner opposite to that described above. Following removal of the door 22a from the opening 18, the dedicated personnel door 16a may be lowered into its closed condition. As previously noted, the reconfiguration of the starboard side personnel door 16b to have the temporary observation door 22b positioned in its opening may proceed in a similar manner to the operational sequence related to the door 22a that was described above.

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. An assembly to allow reconfiguration of an aircraft fuselage door opening which is associated with a dedicated primary aircraft door comprising:
   a central support pole comprising at least one lower mounting clip, the central support pole being attachable to interior structure of an aircraft fuselage so as to be disposed in an upright position within an interior of the aircraft fuselage;
   at least one stand-by alternate door which includes a door frame sized and configured to be operatively accepted by the aircraft fuselage door opening when the dedicated primary aircraft door is in an opened condition, and
   upper and lower mounting assemblies for removably mounting upper and lower portions of the door frame to the central support pole, wherein
   the lower mounting assembly comprises at least one lower mounting arm associated with the lower portion of the door frame which is removably connected to the at least one lower mounting clip of the central support pole such that the at least one stand-by alternate door is removably connected to the central support pole so as to be capable of being movably deployed into a position to close the aircraft fuselage opening when disconnected from the central support pole.

2. The assembly as in claim 1, wherein the upper mounting assembly comprises:
   at least one upper mounting arm associated with the upper portion of the door frame, and
   a mounting carriage slideably coupled to the central support pole for rectilinear movements between raised and lowered positions thereof, wherein
   the mounting carriage includes at least one upper mounting clip removably connected to the at least one upper mounting arm.

3. The assembly as in claim 2, wherein the at least one stand-by alternate door includes a pair of wheels journally mounted to the lower portion of the door frame for rolling movements along a surface.

4. The assembly as in claim 3, wherein the lower portion of the door frame includes a pair of spaced-apart support brackets, and wherein each of the wheels is journally mounted to a respective one of the support brackets.

5. The assembly as in claim 1, wherein the central support pole comprises a tubular main pole and an extension pole received telescopically within the tubular main pole so as to be extendible relative to the main pole and thereby allow lengthwise extension of the central support pole.

6. The assembly as in claim 1, wherein the at least one stand-by alternate door is an observation door which includes a transparent observation bubble window.

7. An aircraft which comprises an assembly as in claim 1.

8. An assembly to allow reconfiguration of an aircraft fuselage door opening which is associated with a dedicated primary aircraft door comprising:
   a central support pole attachable to interior structure of an aircraft fuselage so as to be disposed in an upright position within an interior of the aircraft fuselage; and
   at least one stand-by alternate door which is sized and configured to be operatively accepted by the aircraft fuselage door opening when the dedicated primary aircraft door is in an opened condition, wherein
   the at least one stand-by alternate door is removably connected to the central support pole so as to be capable of being movably deployed into a position to close the aircraft fuselage opening when disconnected from the central support pole, and wherein
   the at least one stand-by alternate door includes a door frame, and a pair of wheels journally mounted to a lower portion of the door frame for rolling movements along a surface.

9. The assembly as in claim 8, wherein the lower portion of the door frame includes a pair of spaced-apart support brackets, and wherein each of the wheels is journally mounted to a respective one of the support brackets.

10. The assembly as in claim 9, wherein the support brackets comprise a connection claw for engagement with a stationary mounting pin associated with the fuselage door opening.

11. The assembly as in claim 9, wherein
   the central support pole comprises at least one lower mounting clip, and wherein
   the at least one stand-by alternate door comprises a lower mounting assembly which includes at least one lower mounting arm associated with the lower portion of the door frame, the at least one lower mounting arm being removably connected to the at least one lower mounting clip of the central support pole.

12. The assembly as in claim 11, wherein the at least one lower mounting arm is positioned between the spaced-apart pair of support brackets.

13. An aircraft comprising:
   an interior cargo hold and a cargo deck within the cargo hold;
   a dedicated primary aircraft personnel door which is moveable into an opened condition to expose a fuselage door opening; and
   an on-board assembly to allow reconfiguration of the fuselage door opening to be closed by a temporary observation door while the dedicated aircraft personnel door is in the opened condition thereof, wherein the assembly comprises:
     (i) a central support pole having opposed ends attached to interior fuselage structure of the aircraft so that the central support pole is positioned to extend substantially vertically upright from the cargo deck of the aircraft within the interior cargo hold adjacent to the fuselage door opening;
     (ii) at least one stand-by observation door which includes a door frame sized and configured to be operatively accepted by the aircraft fuselage door opening when the dedicated personnel aircraft door is in the opened condition thereof, and (iii) upper and lower mounting assemblies for removably mounting upper and lower portions of the door frame to the central support pole, wherein (iv) the lower mounting assembly comprises at least one lower mounting arm associated with the lower portion of the door frame which is removably connected to at least one lower mounting clip of the central support pole such that the at least one stand-by observation door is removably connected to the central support pole so as to be capable of being movably deployed into a position to close the aircraft fuselage opening when disconnected from the central support pole.

14. The aircraft as in claim 13, wherein the upper mounting assembly comprises:
at least one upper mounting arm associated with the upper portion of the door frame, and
a mounting carriage slideably coupled to the central support pole for rectilinear movements between raised and lowered positions thereof, wherein
the mounting carriage includes at least one upper mounting clip removably connected to the at least one upper mounting arm.

15. The aircraft as in claim 14, wherein the observation door includes a pair of wheels journally mounted to the lower portion of the door frame for rolling movements along the cargo deck.

16. The aircraft as in claim 15, wherein the lower portion of the door frame includes a pair of spaced-apart support brackets, and wherein each of the wheels is journally mounted to a respective one of the support brackets.

17. The aircraft as in claim 13, wherein the central support pole comprises a tubular main pole and an extension pole received telescopically within the tubular main pole so as to be extendible relative to the main pole and thereby allow lengthwise extension of the central support pole.

18. The aircraft as in claim 13, wherein the observation door includes a transparent observation bubble window.

19. The aircraft as in claim 13, wherein the observation door comprises a pair of lower support brackets which include a connection claw, and wherein the fuselage door opening comprises a stationary door mounting pin, wherein engagement between the connection claw and the stationary door mounting pin allows the observation door to be pivoted into position about the stationary door mounting pin to close the aircraft fuselage opening.

20. An aircraft comprising:
an interior cargo hold and a cargo deck within the cargo hold;
a dedicated primary aircraft personnel door which is moveable into an opened condition to expose a fuselage door opening; and
an on-board assembly to allow reconfiguration of the fuselage door opening to be closed by a temporary observation door while the dedicated aircraft personnel door is in the opened condition thereof, wherein the assembly comprises:
(i) a central support pole having opposed ends attached to interior fuselage structure of the aircraft so that the central support pole is positioned to extend substantially vertically upright from the cargo deck of the aircraft within the interior cargo hold adjacent to the fuselage door opening; and
(ii) a at least one stand-by observation door which is sized and configured to be operatively accepted by the aircraft fuselage door opening when the dedicated personnel aircraft door is in the opened condition thereof, wherein (iii) the at least one stand-by observation door is removably connected to the central support pole so as to be capable of being movably deployed into a position to close the aircraft fuselage opening when disconnected from the central support pole, and wherein (iv) the observation door includes a door frame, and a pair of wheels journally mounted to a lower portion of the door frame for rolling movements along the cargo deck.

21. The aircraft as in claim 20, wherein the lower portion of the door frame includes a pair of spaced-apart support brackets, and wherein each of the wheels is journally mounted to a respective one of the support brackets.

22. The aircraft as in claim 21, wherein the support brackets comprise a connection claw for engagement with a stationary mounting pin associated with the fuselage door opening.

23. The aircraft as in claim 21, wherein
the central support pole comprises at least one lower mounting clip, and wherein
the observation door comprises a lower mounting assembly which includes at least one lower mounting arm associated with the lower portion of the door frame, the at least one lower mounting arm being removably connected to the at least one lower mounting clip of the central support pole.

24. The aircraft as in claim 23, wherein the at least one mounting arm is positioned between the spaced-apart pair of support brackets.

25. A method for reconfiguring a fuselage door opening normally closed with a dedicated personnel door by a temporary observation door which includes wheels at a lower portion thereof, the method comprising the steps of:
(a) providing an on-board assembly which comprises a central support pole and at least one stand-by observation door removably attached to the central support pole;
(b) positioning the assembly adjacent to the fuselage door opening within an interior cargo hold of the aircraft so that the central support pole thereof extends substantially vertically upright from a cargo deck of the interior cargo hold of the aircraft;
(c) opening the dedicated personnel door into an opened condition thereof to expose the fuselage door opening;
(d) removing the at least one observation door from the central support pole and transporting the at least one observation door to the fuselage door opening by establishing rolling engagement between the wheels of the at least one observation door and the cargo deck and rolling the lower end of the at least one observation door across the cargo deck by the rolling engagement between the wheels and the cargo deck; and
(e) positioning and removably latching the at least one observation door within the fuselage door opening while the primary personnel door is in the opened condition thereof.

26. The method as in claim 25, wherein step (d) further comprises:
(d1) disengaging a lower mounting assembly from the lower portion of the at least one observation door so as to allow the lower portion of the at least one observation door to be moved outwardly away from the central support pole while an upper portion of the at least one observation door remains connected to the central support pole by an upper mounting assembly;

(d2) allowing the upper mounting assembly to be lowered along the mounting pole while the lower portion of the at least one observation door is moved outwardly away from the central support pole according to step (d1); and thereafter (d3) disengaging the upper mounting assembly so that the upper portion of the at least one observation door is disconnected from the central support pole.

27. The method as in claim 25, wherein the lower portion of the at least one observation door comprises a connection claw which is engageable with a stationary mounting pin associated at a lower portion of the fuselage door opening, and wherein step (e) comprises:

(e1) engaging the connection claw and the stationary mounting pin while the upper portion of the at least one observation door is tilted inwardly within the interior cargo hold, and thereafter (e2) pivoting the upper portion of the at least one observation door about the stationary mounting pin until the at least one observation door closes the fuselage door opening.

28. A method for reconfiguring a fuselage door opening normally closed with a dedicated personnel door by a temporary observation door, the method comprising the steps of:

(a) providing an on-board assembly which comprises a central support pole and at least one stand-by observation door removably attached to the central support pole;

(b) positioning the assembly adjacent to the fuselage door opening within an interior cargo hold of the aircraft so that the central support pole thereof extends substantially vertically upright from a cargo deck of the interior cargo hold of the aircraft;

(c) opening the dedicated personnel door into an opened condition thereof to expose the fuselage door opening;

(d) removing the at least one observation door from the central support pole and transporting the at least one observation door to the fuselage door opening; and (e) positioning and removably latching the at least one observation door within the fuselage door opening while the primary personnel door is in the opened condition thereof, wherein step (d) further comprises:

(d1) disengaging a lower mounting assembly from a lower portion of the at least one observation door so as to allow the lower portion of the at least one observation door to be moved outwardly away from the central support pole while an upper portion of the at least one observation door remains connected to the central support pole by an upper mounting assembly;

(d2) allowing the upper mounting assembly to be lowered along the mounting pole while the lower portion of the at least one observation door is moved outwardly away from the central support pole according to step (d1); and thereafter (d3) disengaging the upper mounting assembly so that the upper portion of the at least one observation door is disconnected from the central support pole.

29. The method as in claim 28, wherein the at least one observation door comprises a connection claw at a lower end thereof which is engageable with a stationary mounting pin associated at a lower portion of the fuselage door opening, and wherein step (e) comprises:

(e1) engaging the connection claw and the stationary mounting pin while an upper portion of the at least one observation door is tilted inwardly within the interior cargo hold, and thereafter (e2) pivoting the upper portion of the at least one observation door about the stationary mounting pin until the at least one observation door closes the fuselage door opening.

* * * * *